United States Patent [19]

Hull

[11] 4,064,075

[45] Dec. 20, 1977

[54] CONDUCTIVE, EXTRUDABLE POLYMER COMPOSITION OF POLY(ε-CAPROAMIDE) AND CARBON BLACK

[75] Inventor: Donald Robert Hull, Wilmington, Del.

[73] Assignee: E. I. Du Pont de Nemours and Company, Wilmington, Del.

[21] Appl. No.: 279,825

[22] Filed: Aug. 11, 1972

[51] Int. Cl.² .............................................. H01B 1/06
[52] U.S. Cl. ................................ 252/511; 260/37 N; 57/157 AS; 260/42.53
[58] Field of Search ........... 252/511; 260/37 N, 42.53

[56] References Cited

U.S. PATENT DOCUMENTS

| | | | |
|---|---|---|---|
| 2,437,708 | 3/1948 | Plass et al. | 252/511 |
| 2,472,801 | 6/1949 | Barfield | 252/511 |
| 2,845,962 | 8/1958 | Bulgin | 139/420 |
| 2,846,332 | 8/1958 | Nesty | 260/37 N |
| 2,874,139 | 2/1959 | Symons | 260/37 N |
| 3,706,195 | 12/1972 | Davis et al. | 57/140 BY |

FOREIGN PATENT DOCUMENTS 2,106,784   8/1971   Germany.

*Primary Examiner*—John D. Welsh

[57] ABSTRACT

Highly conductive, extrudable compositions of poly(ε-caproamide) and electrically conductive carbon black.

4 Claims, 1 Drawing Figure

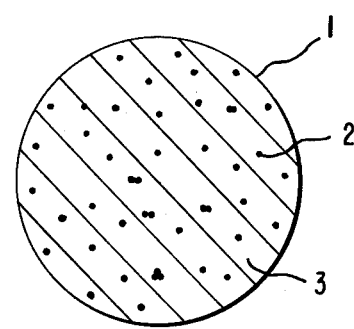

CONDUCTIVE, EXTRUDABLE POLYMER COMPOSITION OF POLY(ε-CAPROAMIDE) AND CARBON BLACK

BACKGROUND OF THE INVENTION

1. Field of the Invention

This invention concerns highly conductive, extrudable compositions of 6-nylon and carbon black, a process for the preparation thereof and highly conductive filaments and fibers prepared therefrom.

2. Description of the Prior Art

The use of electrically conductive carbon black for the preparation of conductive fibers is described in U.S. Pat. No. 2,845,962. Carbon blacks processed for improved electrical conductivity are commercially available.

SUMMARY OF THE INVENTION

This invention includes highly conductive, extrudable compositions comprised of poly(ε-caprolactam) containing from about 16 to about 28%, preferably 17–23%, by weight (based on the composition) of an electrically conductive carbon black. The invention also encompasses highly conductive filaments and fibers prepared from said compositions. Another aspect of the invention is a process for the preparation of highly conductive poly(ε-caprolactam) which includes the steps of polymerizing ε-caprolactam monomer to a high molecular weight in the presence of 16 to 28% by weight (based on the mixture) of electrically conductive carbon black and extruding the product, preferably into filaments.

DESCRIPTION OF THE DRAWING

The FIGURE is a schematic cross-sectional view 1 of a filament of the invention. In the filament cross-section depicted, electrically conductive carbon black 2 is dispersed in the poly(ε-caproamide) matrix 3.

DESCRIPTION OF THE INVENTION

As used herein, the term "highly conductive" as applied to extrudable polymer composition means that the composition has a specific resistance (measured as described herein) of less than 200 ohm-centimeter, preferably less than 50 ohm-centimeter. As applied to filament, the term means that the filament has a resistance of less than $10^9$ ohms per cm. per filament.

Highly conductive poly(ε-caprolactam) compositions can be consistently produced when at least 16% of specially processed, electrically conductive carbon black is incorporated in the polymer. The content of the carbon black, however, should not exceed about 28% if processing difficulties are to be avoided or reduced.

Suitable carbon blacks for this invention include those commercially available extra conductive and so-called super conductive furnace carbon blacks which have been processed to give increased surface area and improved electrical conductivity, e.g., "Vulcan XC-72," "Vulcan SC," "Conductex SC" and "United SCF" as described in the trade literature.

The carbon black is incorporated into the polymer by dispersion in the monomer prior to or during the initial stage of polymerization followed by polymerization of the monomer to high molecular weight, for example, a fiber-forming molecular weight suitable for spinning as noted in U.S. Pat. No. 2,252,555.

The carbon black may be dispersed in the molten caprolactam by milling. The mixture can then be extruded, cooled and cut into chips which are used for polymerization. Alternatively, the carbon black may be dispersed in an aqueous mixture with the monomer and polymerized. Preferably, the monomer is polymerized under melt conditions at temperatures above 250° C. and superatmospheric pressure with agitation to prevent settling of the carbon black during at least the early stages of polymerization. Surprisingly, such agitation can be used without destroying the desired high level of conductivity. The monomer is subjected to the normal stages of polymerization including initial hydrolysis, and condensation to achieve a high molecular weight. This can be done with or without a catalyst.

The resulting highly conductive polymer compositions of the invention are suited for extrusion into articles which retain a high level of conductivity, particularly highly conductive filaments and fibers, preferably of 2–30 denier per filament (dpf). The filaments are generally combined with other yarns, filaments or fibers which are nonconductive and used for imparting antistatic properties to textiles. The conductive filaments may exhibit high elongations just as they are spun, e.g., 200% or greater, or they can be subsequently drawn or stretched at draw ratios of 2.0X or greater to impart higher tenacities and lower elongations, depending on the properties desired.

DESCRIPTION OF TEST PROCEDURES

Filament Resistance

Filament resistance was determined from current flow measured at 6 volts with a Simpson Model 260 ohmmeter on a 2-inch sample length. Three filaments are clamped straight between a pair of electrodes 2 inches apart and a voltags is applied to achieve current flow. Yarn resistance is calculated from the current flow at the known voltage. Resistance per filament is then determined as 3 times the resistance measured for the three filaments.

Polymer Specific Resistance Test

Specific resistivity is determined from the resistance across a 2-inch length of film 1 inch in width and having a thickness of about 0.01 inch. The films are prepared by pressing a powder or pelletized sample of the polymer between two sheets of aluminum foil in a press heated to 220°–260° C. under a pressure of 20,000 psig for 1 to 2 minutes. The sample is removed, cooled and the foil stripped to permit cutting of 1-inch strips therefrom. The thickness of the film is measured with a micrometer. The film strip is clamped between two copper electrodes spaced 2 inches apart and the DC resistance measured with an ohmmeter at 6 volts. Specific resistance in ohm-cm. is calculated from the instrument reading in ohms as the product of the measured resistance times the sample width times the thickness, all divided by the sample length, all in centimeter units.

EXAMPLE I

Poly(ε-caprolactam) is prepared from ε-caprolactam and an extra conductive oil furnace black "Vulcan" XC-72 from the Cabot Corp., Special Black Division, 125 High Street, Boston, Mass. (described in their Technical Bulletin S-8). The black is introduced into molten ε-caprolactam at 23% by weight of the mixture using a "Readco" dough mixer. After mixing for about 30 to 45 minutes, the mixture is poured into a pan, frozen to permit comminution and ground to particles of about 1/16–1/8 inch. The particles, along with varying additional amounts of ϵ-caprolactam to reduce the carbon black concentration, are charged to an autoclave equipped with a stirrer along with a small amount of water. The mixture is polymerized using a short cycle of about 1 hour at 265° C. at 250 psig followed by venting and pressure reduction and holding at the same temperature for about one-half hour at atmospheric pressure prior to casting. Polymer batches of different carbon black concentrations and their specific resistances are shown in Table 1.

TABLE 1

| % Carbon Black | Spec. Resistance, ohm-cm. |
|---|---|
| 9 | ∞ |
| 16.6 | 20.3, 28 |
| 16.6 | ∞ |
| 20 | 31.6, 25.4 |
| 20 | 17.8, 21.6 |
| 23 | 3 |

The polymer compositions are more difficultly extrudable with increasing carbon black content. The specific resistance is erratic at the lower carbon black content and then decreases with increasing content. Two of the compositions are melt-spun into yarns in a conventional manner and drawn 4× using a hot plate to assist the drawings. The yarns, containing 17 filaments and of about 300 total denier, have physical properties as shown in Table 2.

TABLE 2

| % Carbon Black | Ten., gpd. | Elong., % | Initial Mod., gpd. |
|---|---|---|---|
| 9 | 2.0 | 24.6 | 18 |
| 16.6 | 1.3 | 21.6 | 12 |

Filling face satin fabrics were prepared containing the carbon black yarn in the fill and nonconducting nylon yarn in the warp and were measured for conductivity by clamping (in the fill direction) a 4-inch long by 0.75-inch wide sample between copper electrodes 2 inches apart and applying 6 volts D.C. The resistances are read directly off the ohmmeter (Simpson Model 260). As seen in Table 3, the level of 16.6% carbon black provides a noticeable reduction in fabric resistance.

TABLE 3

| Item | Fabric Resistance, ohm |
|---|---|
| 9% Carbon Black | ∞ |
| 16.6% Carbon Black | $6 \times 10^6$ |
| All Nonconducting Yarn | ∞ |

An attempt was made to prepare conductive compositions of poly-(ϵ-caprolactam) by coating commercial polymer molding pellets with an aqueous slurry of 10% ϵ-caprolactam and 20% to 23% carbon black of the type used above, all based on the weight of polymer pellets. The coated pellets were charged to a 28 millimeter twin-screw melter-extruder having two kneading sections separated by a reverse flow section manufactured by the Werner and Pfleiderer Co. No highly conductive product was obtained.

EXAMPLE II

Three batches of highly conductive poly(ϵ-caprolactam) were prepared. In each case a slurry of 34.1 kilograms of Cabot carbon black XC-72, 123.0 kilograms of water and ϵ-caprolactam (136.0 kilograms for 22% carbon black, 113.5 kilograms for 25% carbon black and 97.6 kilograms for 28% carbon black) was prepared in an agitated mixing tank at 50°–55° C. and charged into a stainless steel autoclave equipped with a helical ribbon agitator. The clave was purged and filled with an inert gas then heated to about 250° C. at a pressure of 250 psi. This step, which takes 6–7 hours, results in ring opening and prepolymerization and is followed with a reduction cycle where the pressure is reduced gradually to atmospheric pressure (about 1 ½ hours). The polymer was extruded into a ribbon, quenched in water, and then cut into 1/8 – 1/4 inch flake. Monomer is extracted by three consecutive washings with water in a stirred kettle at 95° C. (4 hours each). The flake was dried under vacuum (25 inches mercury) until the moisture content was less than 0.3%. The flake was then remelted, filtered (screens of 30 to 200 mesh), pelletized and redried to less than 0.3% moisture. Specific resistances for the three batches were as follows:

TABLE 4

| % Carbon Black | Specific Resistance, ohm-cm. |
|---|---|
| 22 | 10–60 |
| 25 | 10–30 |
| 28 | 5–10 |

The flake containing 22% carbon black was spun at a throughput of 24.3 gm./min. through a spinneret containing 40 holes with a windup speed suitable for the deniers noted in Table 5. During spinning the screw melter temperatures are set at 230° C. Zone 1, 270° C. Zone 2, and 266° C. at the spinning block. The yarns are drawn by use of a differential speed between feed rolls and draw rolls with the feed roll heated to 140° C.

The physical and conductivity properties are listed in Table 5.

TABLE 5

| DPF | Draw Ratio | Filament Resistance ohm/filament/cm. | Tenacity, gpd. | % Elong. | Initial Mod., gpd. |
|---|---|---|---|---|---|
| 6.9 | 1.0X | $3.4 \times 10^6$ | 0.6 | 309 | 3.0 |
| 4.0 | 2.0X | $4.2 \times 10^7$ | 1.1 | 129 | 3.1 |
| 8.0 | 1.5X | $3.4 \times 10^6$ | 0.9 | 192 | 4.8 |

Yarn physical properties are determined in the customary manner using an Instron tensile tester.

What is claimed is:

1. Highly conductive, extrudable polymer composition having a specific resistance of less than 200 ohm-centimeter consisting essentially of poly (ϵ-caproamide) containing from about 16 to about 28% by weight based on the weight of the composition of an electrically conductive carbon black.

2. The product of claim 1 wherein the carbon black is present in the range of between 17 and 23% by weight.

3. A highly conductive filament having a resistance of less than $10^9$ ohms per cm. of the composition of claim 1.

4. A filament according to claim 3 that has been drawn at least 2.0×.